April 2, 1968     F. F. ZOCHIL     3,375,766

TROWELLING APPARATUS FOR CEMENT SURFACING MACHINES

Filed Aug. 7, 1964     3 Sheets-Sheet 1

INVENTOR
FRANCESCO F ZOCHIL
BY *Church & Rogers*
PATENT AGENTS

April 2, 1968  F. F. ZOCHIL  3,375,766
TROWELLING APPARATUS FOR CEMENT SURFACING MACHINES
Filed Aug. 7, 1964  3 Sheets-Sheet 2

INVENTOR
FRANCESCO F ZOCHIL
BY Church & Rogers
PATENT AGENTS

INVENTOR.
FRANCESCO F. ZOCHIL
BY Church & Rogers
PATENT AGENTS

United States Patent Office 3,375,766
Patented Apr. 2, 1968

3,375,766
TROWELLING APPARATUS FOR CEMENT SURFACING MACHINES
Francesco F. Zochil, Hamilton, Ontario, Canada, assignor to Hamilton Float & Trowel Limited, Hamilton, Ontario, Canada
Filed Aug. 7, 1964, Ser. No. 388,253
4 Claims. (Cl. 94—45)

The present invention pertains, generally, to cement or concrete trowelling apparatus or equipment.

More particularly, the present invention pertains to cement or concrete trowelling equipment or apparatus that is so constructed and arranged as to present an assembly for the support rotatably mounted cement surface trowelling float blades as are standard component parts of cement trowelling equipment, said assembly, in turn, being so constructed and arranged as to enable, as the trailing edge portions of the floating blades become worn, the blades thereof to be quickly and readily reversed in position, further enabling the initial unworn leading edge portions to replace the worn trailing edge portions.

Accordingly, it is a primary object of the present invention to provide cement or concrete trowelling equipment or apparatus that is so constructed and arranged as to present an assembly for the support of rotatably mounted cement surface trowelling float blades as are standard component parts of cement trowelling equipment, said assembly, in turn, being so constructed and arranged as to enable, as the trailing edge portions of the floating blades become worn, the blades thereof to be quickly and readily reversed in position, further enabling the initial unworn leading edge portions to replace the worn trailing edge portions.

Another primary object of this invention is to provide cement or concrete trowelling equipment or apparatus that is so constructed and arranged as to present an assembly for the support of rotatably mounted cement surface trowelling float blades as are standard component parts of cement trowelling equipment, said assembly, in turn, being so constructed and arranged as to enable reversing the position, or replacement, of the trowels without the necessity of using tools.

Yet another primary object of the present invention is to provide cement or concrete trowelling equipment or apparatus that is so constructed and arranged as to present similar bracket assemblies for the support of rotatably mounted cement surface trowelling float blades as are standard component parts of cement trowelling equipment, each of said assemblies being particularly adapted to be secured to one of the usual radial arms rotatable in a horizontal plane in a cement finishing machine, each assembly having a float trowel attached to its under surface, and being particularly adapted to have a readily removable finishing trowel structurally operatively associated therewith.

In carrying out the aforesaid primary objects of the present invention, and others that will be readily apparent to those skilled in the art, an upper face of the flat blade carries a pair of channel members extending along the side portions thereof to either independently or conjointly receive the edge portions of a component part of a blade supporting assembly insertable into said channel members.

Other objects and important features of the invention will be apparent from a study of the specification following taken with the drawings, which together show, illustrate, describe and disclose preferred embodiments or modifications of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Figure 1:
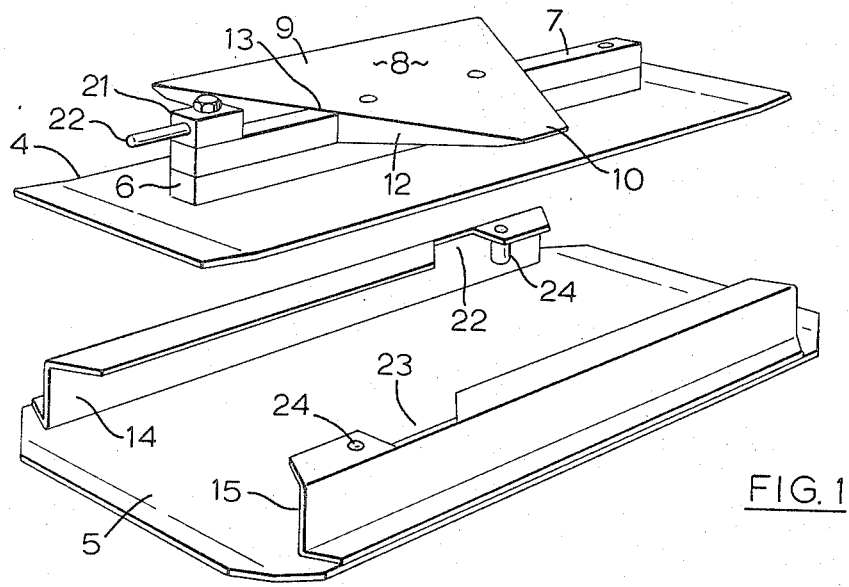
FIGURE 1 is an exploded view illustrating the components of one embodiment of an assembly or mounting arrangement constructed in accordance with the principles of the present invention.
Figure 2:
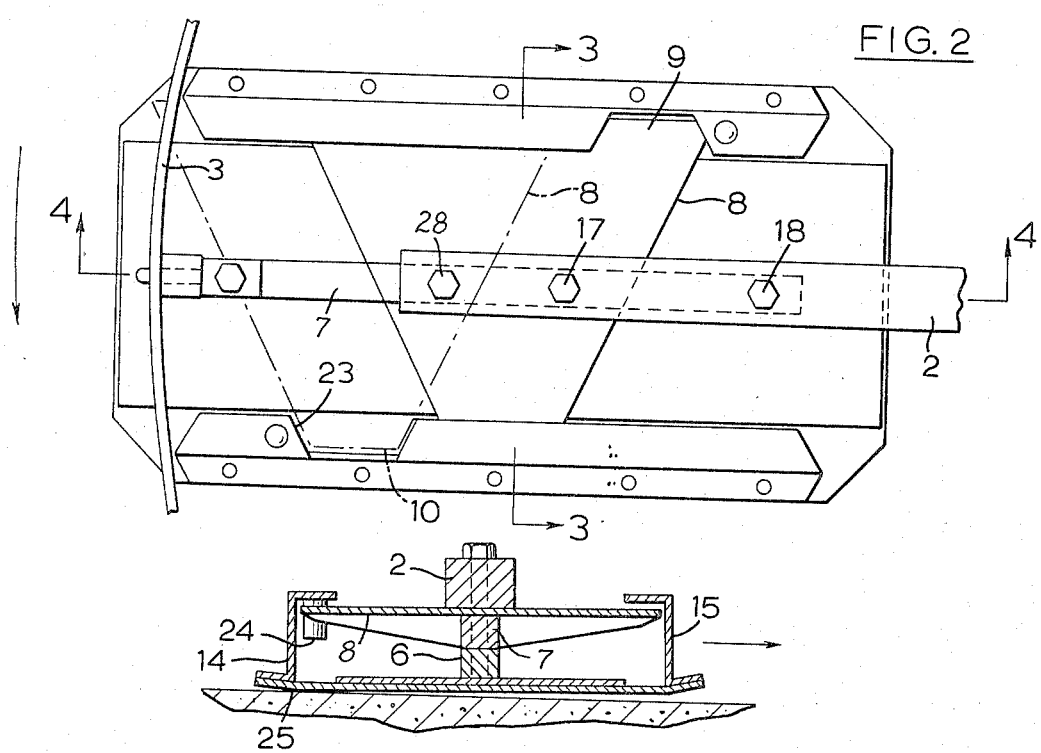
FIGURE 2 is a plan view of the completely assembled components shown in FIGURE 1 carried by a radial arm.
Figure 3:
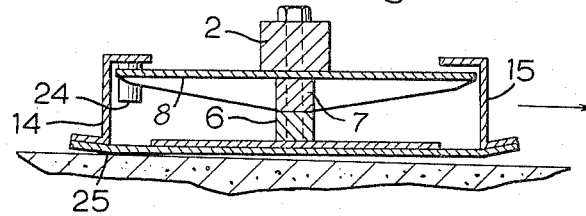
FIGURE 3 is a vertical cross-sectional view taken along the line 3—3 of FIGURE 2.
Figure 4:
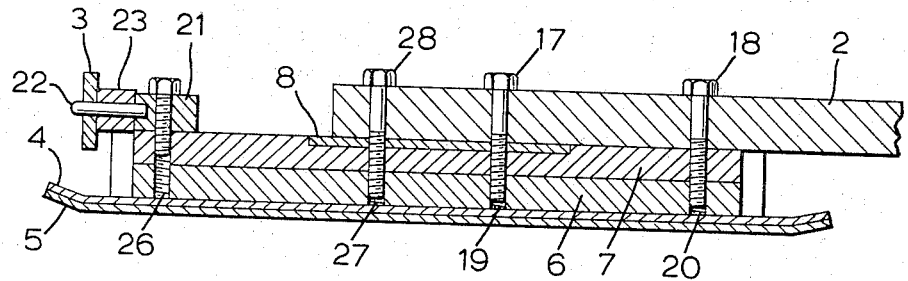
FIGURE 4 is a vertical cross-sectional view taken along the line 4—4 of FIGURE 2.
Figure 5:
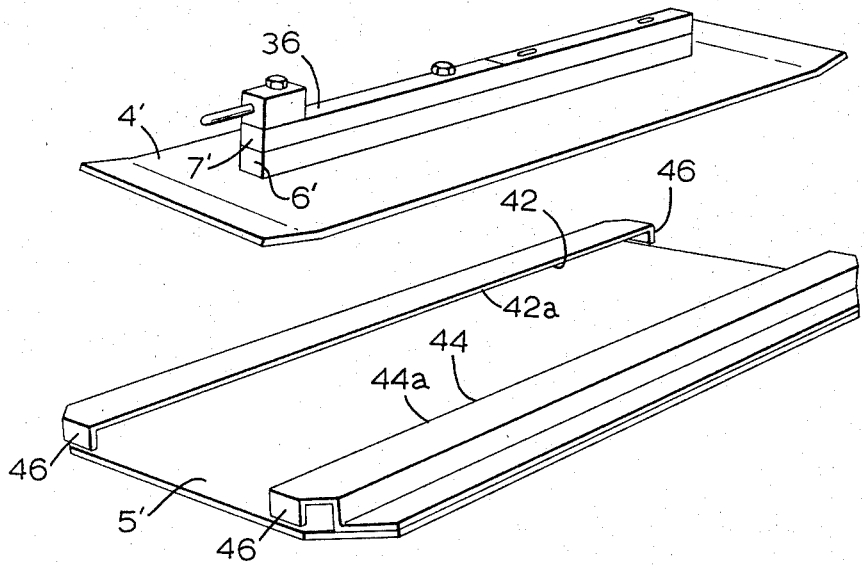
FIGURE 5 is an exploded view illustrating the components of another embodiment of an assembly or mounting arrangement constructed in accordance with the principles of the present invention.
Figure 6:
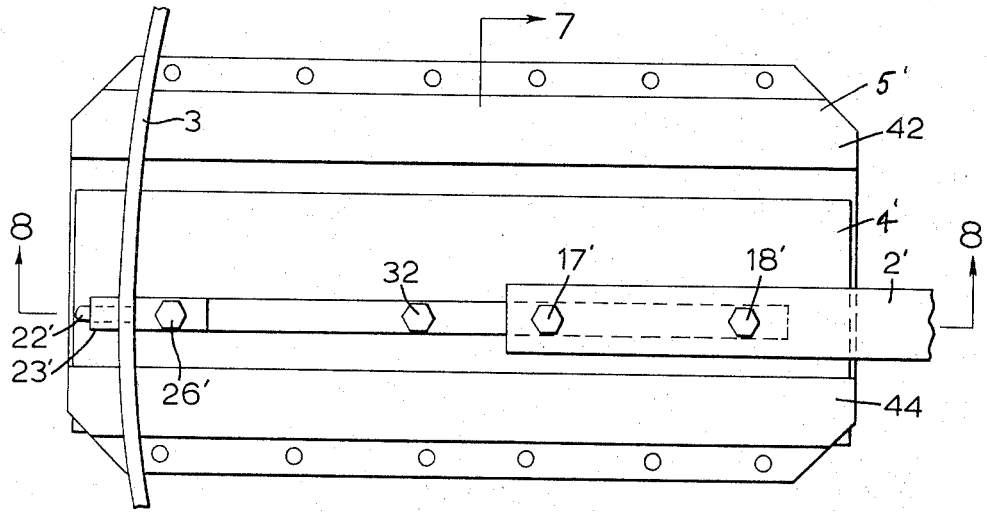
FIGURE 6 is a plan view of the completely assembled components shown in FIGURE 5 carried by a radial arm.

In standard practice, a cement finishing machine includes a suitably mounted power driven vertical shaft from which a plurality of radial sweep arms extend to be rotated in a horizontal plane by the shaft, cement surfacing float trowels being carried by the arms to rest upon and smooth the surface of freshly poured cement or concrete in their rotative movement, the machine being guided over the cement surface by the operator of the machine. The path of rotation of the arms is surrounded by a guard ring which may be mounted upon the outer ends of the arms to rotate therewith or be of the stationary type wherein it is supported upon the outer ends of stationary arms radiating from the machine above the rotating trowel carrying arms.

In the drawings, a machine in its entirety has not been shown, as the invention is confined to a novel arrangement for mounting trowels upon the rotatable arms. However, a fragmentary portion of one of such arms 2 is shown, there also being shown a portion of a guard ring 3 supported by and rotating in unison with the arm 2.

With reference now to the drawings, and particularly FIGURES 1 through 4, there is illustrated therein the outer end portion of one of the radial sweep arms 2, and also a portion of a guard ring 3 supported and rotating in unison with the arm 2. An assembly is provided that comprises a trowel blade 4 and a float blade 5, both being of generally rectangular shape; the blade 4 carrying a rectangular center bar 6 extending centrally and longitudinally thereof and secured to the upper face of the blade, a second bar 7, similar to the bar 6, being provided to rest upon the bar 6.

The assembly comprises, further, a plate 8 extending across the top of the bar 7, the plate being of substantially triangular shape and having its base portion 9 extending in parallel relation to the bar 7 at one side of the bar and its truncated apex portion 10 located at the other side of the bar. The edges of the plate intersecting the bar 7 are formed with downturned strengthening lips 12 having gaps 13 through which the bar extends. For support of the guard ring 3, a block 21 is secured upon the top face of the end of the bar 7 to carry a pin 22 freely projecting through a sleeve 23 upon the ring.

The blade 5 is attachable to and supported by the plate 8, being provided along the side edge portions of its upper face with a pair of Z-strips forming inwardly facing channels 14 and 15 having their parallel inner faces spaced apart a distance substantially equivalent to the distance from apex to base of the plate 8. The upper flange of each channel is formed with a cut away slot through which the apex portion 10 of the plate may be passed to enter the channel, the slot 22 being located towards one end of the channel 14 and the slot 23 located towards the opposite end of the channel 15. To position the blade 5 upon the plate 8 the base portion 9 of the plate is, for example, transversely inserted under the flange of the channel 14 which will permit the apex portion 10 of the plate to drop downwardly through the slot 23 into the channel 15; the plate being then pushed along the channels from the position shown in dotted lines to the position shown in full lines, FIGURE 2. The plate is retained from sliding from out of the open ends of the channels by stop pins 24 projecting downwardly into the channels in the vicinity of their ends. Once the blade 5 is positioned in the channels, as shown in full lines in FIGURE 2, it will remain in such position under centrifugal force in its cement trowelling rotation. As the trailing edge portion 25 of the blade becomes worn it may be readily reversed by slipping it off the plate 8, turning it end for end and repositioning it upon the plate.

The foregoing described assembly is secured to one of the arms 2 through the medium of a pair of screws 17 and 18 which extend downwardly through a pair of aligned orifices in the arm and bar 7 and are threaded into orifices 19 and 20 in the bar 6 which is secured to the blade 4. To permit the bar 6 and blade 4 to be reversed for replacement of a worn edge of the blade with the opposite unworn edge, the bar 6 contains a pair of threaded orifices 26 and 27 which take the place of the threaded orifices 19 and 20 when the bar is reversed and receive the screws 17 and 18. A third screw 28 extends through aligned orifices in the arm 2 and bar 7 for reception into either of the threaded orifices 27 or 19, depending upon the position of the bar 6.

From the foregoing description it will be apparent that there is provided a very simple arrangement by means of which the blade 5 may be instantly attached, removed and reversed without the use of tools. To retain the blade against excessive movement in relation to the supporting plate 8, it will be seen upon reference to FIGURE 3 that the combined thicknesses of the plate 8, bar-like members 6 and 7 blade 4 is only slightly less than the depth of the channels.

With reference now to FIGURES 5 through 8, wherein like reference characters indicate like parts, but wherein such like characters are primed, there is illustrated therein another embodiment of an assembly constructed in accordance with the principles of the present invention.

The assembly comprises a trowel blade 4' and a float blade 5', both being of rectangular shape with slightly upturned edge portions, following standard practice. The blade 4' carries a rectangular center bar 6' extending longitudinally thereof and secured to the upper face of the blade. A second bar 7', similar to the bar 6', is provided to rest upon the bar 6', the two bars 6' and 7' being attached to the sweep arm 2' of the trowelling machine by screws 17' and 18'.

Figure 7:
FIGURE 7 is a vertical cross-sectional view taken along the line 7—7 of FIGURE 6.
Figure 8:
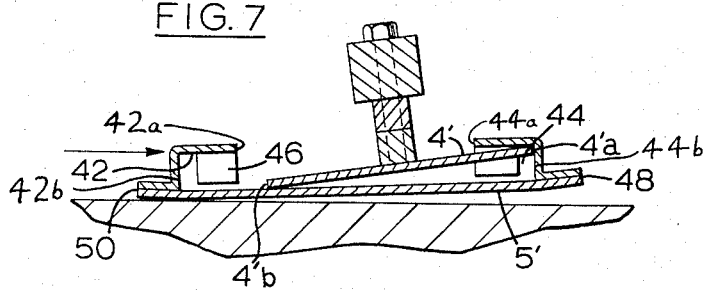
FIGURE 8 is a vertical cross-sectional view taken along the line 8—8 of FIGURE 6.
Figure 8:
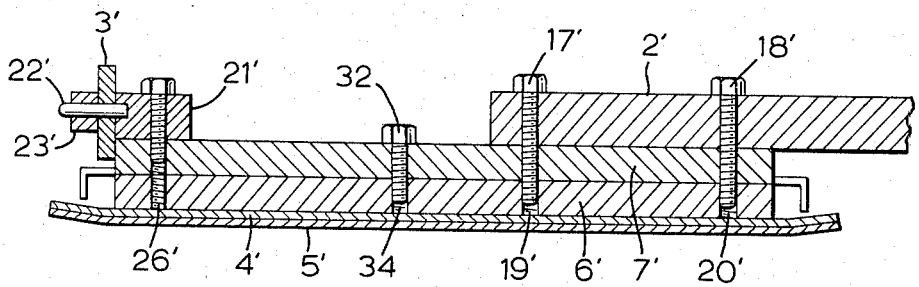

The blade 5' comprises a pair of one-piece Z-strips each having one arm extending parallel to and secured to the side portions of the blade top face. The connecting parts of the Z-strips extend generally perpendicular to the top face, and the other arms extend generally parallel to the said face, thereby forming with the blade face a pair of facing channels 42 and 44 having integral down turned transverse end lips 46. Upon reference to FIGURE 7 it will be seen that the blade 5' is simply supported by insertion of the leading edge portion 4'a of the blade 4' into its channel 44, and subsequent anticlockwise rotation (as seen in FIGURE 7) of the blade until its trailing edge portion 4'b is in contact with the top face of the blade 5', end movement of the blade 5' relatively to the blade 4' being restricted by the channel end lip 46. Referring to FIGURE 7, it is standard practice to have the blades 5' set at a slight upward inclination in their direction of movement, while the spacing between the said other arms of the Z-strips and the upper surface of the blade 4' is such that each blade 4' has a similar upward inclination relative to the respective blade 5'.

It will be noted that, while the channel 44 (as illustrated) is retaining the blade 5' on the blade 4', the other channel 42 constitutes means on the float trowel 5' for releasably retaining the latter trowel on the finish trowel 4', the abovedescribed upward inclination of the trowel 4' in combination with the large mouth of the channel provided by the Z-strip ensuring that a positive retaining action is achieved. Thus, if the arm and the bar 7' are suddenly stopped, owing for example to a malfunction of the driving motor or the intervening gear, or to engagement with a particular type of obstruction, then the blade 4' will stop suddenly, but the blade 5' will attempt to continue its motion under a combination of its own momentum and centrifugal force. In known types of float trowel, in which means such as a clip is originally provided as retaining means, it has not been unknown for the clip to be ineffective, and for a malfunction such as described above to cause the heavy float trowel to be thrown forcibly outwards by the machine, with the consequent danger of injury to the operator and bystanders. It will be seen that with a trowel blade in accordance with the invention, when such circumstances occur, the blade 5' will be safely retained by engagement of the channel 42 with the trailing edge of the blade 4'. Similarly, when the blade 5' has been reversed the channel 42 retains the blades 4' and 5' in operative relationship, while the channel 44 constitutes the respective releasable retaining means.

From the foregoing description it will be apparent that either of the blades 4' or 5' may be used at discretion of the operator. If blade 4' is to be used in place of blade 5', it is only required to remove the blade 5'. To enable the blades to be reversed in position, whereby their unworn trailing edge portions 50 (FIGURE 7) can be substituted for the leading edge portions 48 when the latter become too worn for further use, the bar 6' contains the threaded orifices 26' and 34, in addition to the threaded orifices 19' and 20', the pair of orifices 26' and 34 being similarly spaced and positioned, in one half portion of the bar, to the pair of orifices 19' and 20' in the other half portion of the bar. In reversing each blade 4' it is therefore only necessary to remove the blade 5', then remove the screws 17', 18' and 32 to release the bar 6' and its attached blade 4', thus permitting the bar and blade to be reversed in position wherein the pair of threaded orifices 26' and 34 in the bar take the place of the pair of orifices 19' and 20' for reception of the screws 17' and 18', the orifice 19 taking the place of the orifice 34 for reception of the screw 32. At this point it will be understood that, while the float blade 5' is illustrated as being capable of use with the trowel blade 4', it is equally capable of use with the trowel blade 4. Similarly, while the float blade 5 is illustrated as being capable of use wtih the trowel blade 4, it is equally capable of use with the trowel blade 4'. For that matter, the float blades 5 and 5' are capable of use independently of the trowel blades 4 and 4'.

In addition, it will be understood that the trowel blades 4 and 4' are themselves capable of use independently of the float blades 5 and 5', each of the trowel blades being reversible, as are the float blades. In fact, the trowel blades may be used manually. With respect to the trowel blade 4', the particular construction, configuration and arrangement of the bracket 30 enables this blade to be structurally operatively associated with other elements with extreme facility.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What is claimed is:

1. A blade assembly for attachment to a rotatable sweep arm of a machine for trowelling the surface of cement and comprising a horizontal plate of truncated triangular form, a bar-like member underlying the central portion of the bottom surface of the plate and whereby the apex portion of the plate protrudes from one side of the bar-like member and the base portion of the plate protrudes from the other side of the bar-like member, the bar-like member being secured to and projecting from the end of the sweep arm, a cement trowelling blade adapted to be positioned underneath the bar-like member and to be detachably carried by the triangular plate, a pair of inwardly facing channel members for reception of the plate and carried upon the side portions of the upper face of the blade and having their inner vertical faces spaced apart a distance somewhat greater than the distance between the base of the plate and its truncated apex, each channel having an upper inturned horizontal flange, one flange overlying the base portion of the plate and the other flange overlying the apex portion of the plate when the plate is received within the channels, one end portion of each flange being formed with a slot of just sufficient size to permit passage of the apex portion of the plate into and out of the slot, and stop means projecting into each channel and against which the plate is urged by centrifugal force as the sweep arm rotates, each said stop means retaining the blade on the triangular plate and locating the triangular plate in the channels with the respective flange slot out of register with the said apex portion of the plate.

2. A blade assembly as defined in claim 1, wherein a second bar-like member underlies and extends along the first bar-like member, a second cement trowelling blade attached to the second bar-like member and overlying the first trowelling blade, the combined thicknesses of the plate, two bar-like members and second trowelling blade being slightly less than the depth of the channels, and means for detachably securing the second bar-like member to the first bar-like member.

3. A blade assembly as defined in claim 2, wherein the second bar-like member contains two pairs of equally spaced apart threaded orifices and so arranged that one pair of orifices is in one half of the length of the member and the other pair of orifices in the other half of the length of the member, and a pair of attachment screws extending through a pair of orifices in the first bar-like member and threaded into a pair of orifices in the second bar-like member.

4. A blade assembly for attachment to a rotatable sweep arm of a machine for trowelling the surface of cement, said blade assembly being detachably reversibly positioned beneath a first blade carried by the said sweep arm, the blade assembly comprising a second blade of generally rectangular shape and having generally parallel straight leading and trailing edges and generally parallel straight end edges, a pair of similar Z-members each fixed to and extending continuously along the length of a respective one of the said leading and trailing edges with an arm portion thereof fixed to the blade upper surface in the neighbourhood of the corresponding edge, a connecting portion extending perpendicular to the blade upper surface and the other arm portion extending parallel to the blade upper surface to provide respective facing channels each adapted for engagement over the corresponding leading edge of the first blade, the width of said first blade being less than the distance from one of said connecting portions to the nearest edge of the said other arm portion of the other Z-member whereby the said second blade may be engaged on the first blade by engagement of the first blade leading edge in the respective channel and relative rotation of the blade about the said engaged edge so that the blades move towards each other, the spacing of the said other arm portion of each channel from the blade upper surface being such that the first blade can incline at an upward angle relative to the second blade and the Z-member adjacent the first blade trailing edge constitutes releasable retaining means for the second blade in case of rearward movement of the first blade relative to the second blade, and stop means at the ends of each Z-member channel to prevent endwise movement of the first blade out of the channel.

References Cited

UNITED STATES PATENTS

| 2,556,983 | 6/1951  | Root     | 94—45 |
| 2,662,454 | 12/1953 | Whiteman | 94—45 |
| 2,865,269 | 12/1958 | McMillan | 94—45 |

JACOB L. NACKENOFF, *Primary Examiner.*